(12) United States Patent
Pino et al.

(10) Patent No.: US 9,904,672 B2
(45) Date of Patent: Feb. 27, 2018

(54) MACHINE-TRANSLATION BASED CORRECTIONS

(71) Applicant: Facebook, Inc., Menlo Park, CA (US)

(72) Inventors: Juan Miguel Pino, Cambridge (GB); Matthias Gerhard Eck, Mountain View, CA (US); Rui Andre Augusto Ferreira, London (GB)

(73) Assignee: Facebook, Inc., Menlo Park, CA (US)

( * ) Notice: Subject to any disclaimer, the term of this patent is extended or adjusted under 35 U.S.C. 154(b) by 227 days.

(21) Appl. No.: 14/788,679

(22) Filed: Jun. 30, 2015

(65) Prior Publication Data

US 2017/0004121 A1    Jan. 5, 2017

(51) Int. Cl.
*G06F 17/27* (2006.01)

(52) U.S. Cl.
CPC ........ *G06F 17/2775* (2013.01); *G06F 17/273* (2013.01)

(58) Field of Classification Search
CPC .................................................... G06F 17/273
See application file for complete search history.

(56) References Cited

U.S. PATENT DOCUMENTS

| | | | | |
|---|---|---|---|---|
| 6,618,697 | B1 * | 9/2003 | Kantrowitz | G06F 17/273 703/2 |
| 7,640,158 | B2 * | 12/2009 | Detlef | G06F 17/273 704/235 |
| 8,156,414 | B2 * | 4/2012 | Zandifar | H04L 1/0045 382/155 |
| 9,286,526 | B1 * | 3/2016 | Manohar | G06K 9/033 |
| 2002/0156816 | A1 * | 10/2002 | Kantrowitz | G06F 17/273 715/256 |
| 2009/0182728 | A1 | 7/2009 | Anderson et al. | |
| 2009/0226098 | A1 | 9/2009 | Takahashi et al. | |
| 2011/0193797 | A1 | 8/2011 | Unruh | |
| 2013/0096911 | A1 * | 4/2013 | Beaufort | G06F 17/273 704/9 |

(Continued)

OTHER PUBLICATIONS

U.S. Appl. No. 14/788,578, by Eck, M., et al., filed Jun. 30, 2015.

(Continued)

*Primary Examiner* — Douglas Godbold
(74) *Attorney, Agent, or Firm* — Perkins Coie LLP (57) ABSTRACT

Technology is disclosed for building correction models that correct natural language snippets. Correction models can include rules comprising pairs of word sequences identified from viable correction snippet pairs, where a first sequence of words in the pair should be replaced with a second sequence of words in the pair. Viable correction snippet pairs can be identified from among pairs of language snippets, such as a post to a social media website and a subsequent update to that post. Viable corrections can be the snippet pairs that both have no more unaligned words than a word alignment threshold and have no aligned word pair with a character edit difference above an edit distance threshold. In some implementations, word alignments can be found by aligning all the characters between a pair of language snippets, and identifying aligned words as those that have at least one aligned letter in common.

20 Claims, 7 Drawing Sheets

(56) References Cited

U.S. PATENT DOCUMENTS

| | | | |
|---|---|---|---|
| 2014/0095143 A1* | 4/2014 | Jan | G06F 17/2223 |
| | | | 704/2 |
| 2015/0051896 A1* | 2/2015 | Simard | G06F 17/289 |
| | | | 704/2 |
| 2017/0004120 A1 | 1/2017 | Eck et al. | |
| 2017/0017636 A1* | 1/2017 | Hasan | G06F 17/273 |

OTHER PUBLICATIONS

Koehn, P. et al., "Statistical Phrase-Based Translation," Proceedings of the 2003 Conference of the North American Chapter of the Association for Computational Linguistics on Human Language Technology—vol. 1, Assoc. for Computational Linguistics, 2003, pp. 48-54.

Vogel, S. et al., "HMM-Based Word Alignment in Statistical Translation." In Proceedings of the 16th Conference on Computational Linguistics—vol. 2, Assoc. for Computational Linguistics, 1996, pp. 836-841.

U.S. Appl. No. 15/387,514 by Pino, J., et al., filed Dec. 21, 2016.
U.S. Appl. No. 15/387,535 by Pino, J., et al., filed Dec. 21, 2016.
U.S. Appl. No. 15/387,551 by Pino, J., et al., filed Dec. 21, 2016.
Non-Final Office Action dated Sep. 8, 2017 in U.S. Appl. No. 14/788,578, by Eck, M., et al., filed Jun. 30, 2015.

\* cited by examiner

MACHINE-TRANSLATION BASED CORRECTIONS

BACKGROUND

The Internet has made it possible for people to connect and share information globally in ways previously undreamt of. Social media platforms, for example, enable people on opposite sides of the world to collaborate on ideas, discuss current events, or simply share what they had for lunch. The amount of content generated through social media technologies is staggering. It is common for social media providers to operate databases with petabytes of media items, while leading providers are already looking toward technology to handle exabytes of data. Media items at least partially containing natural language ("language snippets") are subject to some human error. While at times language snippet authors correct these errors as they enter them, often these errors are only identified by an automated system or remain uncorrected.

Errors have been a particularly prevalent problem for machine translations of language snippets. Machine translation engines enable a user to select or provide a source content item (e.g., a message from an acquaintance) in one natural language (e.g., Spanish) and quickly receive a translation of the content item in a different natural language (e.g., English). Machine translation engines can be created using training data that includes identical or similar content in two or more languages. However, the effectiveness of these machine translation engines can be significantly reduced when the source content item contains errors.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

A natural language correction system is disclosed that generates correction models by identifying corrections in language snippets and uses the correction models to correct other language snippets. As used herein, a "language snippet" is a digital representation of one or more words or character groups. In some implementations, language snippets can be obtained from social network content items, such as posts. A "correction model" can analyze a language snippet and replace one or more words or characters, identified as errors, with corresponding identified revisions according to "rules" identified in the correction model. The natural language correction system can identify rules from pairs of language snippets by obtaining multiple snippet pairs and filtering out the pairs that are not viable correction pairs. The natural language correction system can perform this filtering for each selected snippet pair, of the obtained snippet pairs, by determining a word alignment for that snippet pair, and filtering out those snippet pairs that have a word alignment score above a first threshold value or that have any aligned word pair with a character edit distance above a second threshold value. The natural language correction system can identify snippet pairs that remain as viable corrections. The natural language correction system can then extract rules from viable correction pairs by identifying aligned words or word groups and assigning a score to the identified aligned words or word groups.

An "edit distance," as used herein, is a number of changes used to change a first language snippet or word into a corresponding language snippet or word. In some implementations, changes include insertions, deletions, and substitutions, e.g. edit distance calculated using Levenshtein distance. In some implementations, changes include insertions, deletions, substitutions, and transpositions, e.g. edit distance calculated using Damerau-Levenshtein distance. As used herein, a "transposition" is a change that moves a word within a snippet or a character within a character grouping without otherwise editing the moved word or character. A transposition can have a length indicating the number of word or character spaces, forward or backward a moved word or character is moved. In some implementations, transposition length can be limited to one. As used herein, unless otherwise specified, an "edit distance" can refer to a count of changed based on Levenshtein distance, Damerau-Levenshtein distance, or a modified version of either as discussed below.

An edit distance can be a "character edit distance" between two sequences of characters, such as words, indicating a number of character changes used to convert a first of the two sequences of characters into a second of the two sequences of characters. An edit distance can be a "word edit distance" between two snippets indicating a number of entire word changes used to convert a first of the two snippets into a second of the two snippets. A "minimum edit distance" is the edit distance using a word or character alignment that yields the smallest possible edit distance. A minimum edit distance can be a "minimum character edit distance" or a "minimum word edit distance." For example, the minimum character edit distance (using Levenshtein distance) between the words of the word pair ("Spartacus", "particle") is four, resulting from: (1) deleting "S," i.e. Spartacus→partacus; (2) substituting the second "a" for an "i," i.e. partacus→particus; (3) substituting the second "u" for an "l," i.e. particus→particls; and (4) substituting the remaining "s" for an "e," i.e. particls→particle. As another example, the minimum word edit distance (using Damerau-Levenshtein distance) between the snippets ("That's awesome toadly, buddy!", "That is totally awesome, buddy!") is four, resulting from: (1) substituting "That" for "That's;" (2) inserting "is;" (3) transposing "awesome" with "toadly;" and (4) substituting "totally" for "toadly."

In various implementations, the natural language correction system can train the correction models with spelling, grammar, punctuation, or phrasing rules, and can employ the rules in an auto-correction or suggestion function of a language input module or as an initial stage of performing a machine translation. For example, a rule can specify a correction, such as "likr"→"like." Subsequent observations of a user entering "likr" can automatically be changed to "like," or "like" can be suggested as a modification to the user.

As another example, a correction module that has been trained with the "likr"→"like" correction can be used during a machine translation of the language snippet "I really likr your painting." The "likr" word will not have a direct translation, which can result in the translation including the untranslated word or an incorrect translation. This can make the translation difficult to understand and frustrating for viewers. To prevent this, the natural language correction system can perform an initial step in the machine translation process to make corrections to the language snippet prior to translating it. For example, in a process to translate the original language snippet of "I really likr your painting" into Spanish, the translation process can create an intermediate corrected language snippet "I really like your painting," which the machine translation process can then translate into "Me gusta mucho to cuadro." In some implementations, the intermediate corrected language snippet is both used as a basis for the translation of a snippet and replaces the snippet where it appears in in the untranslated form. In some implementations, the intermediate corrected language snippet is used as a basis for the translation of a snippet but the original uncorrected snippet appears when an untranslated version of the snippet is displayed.

Figure 1:
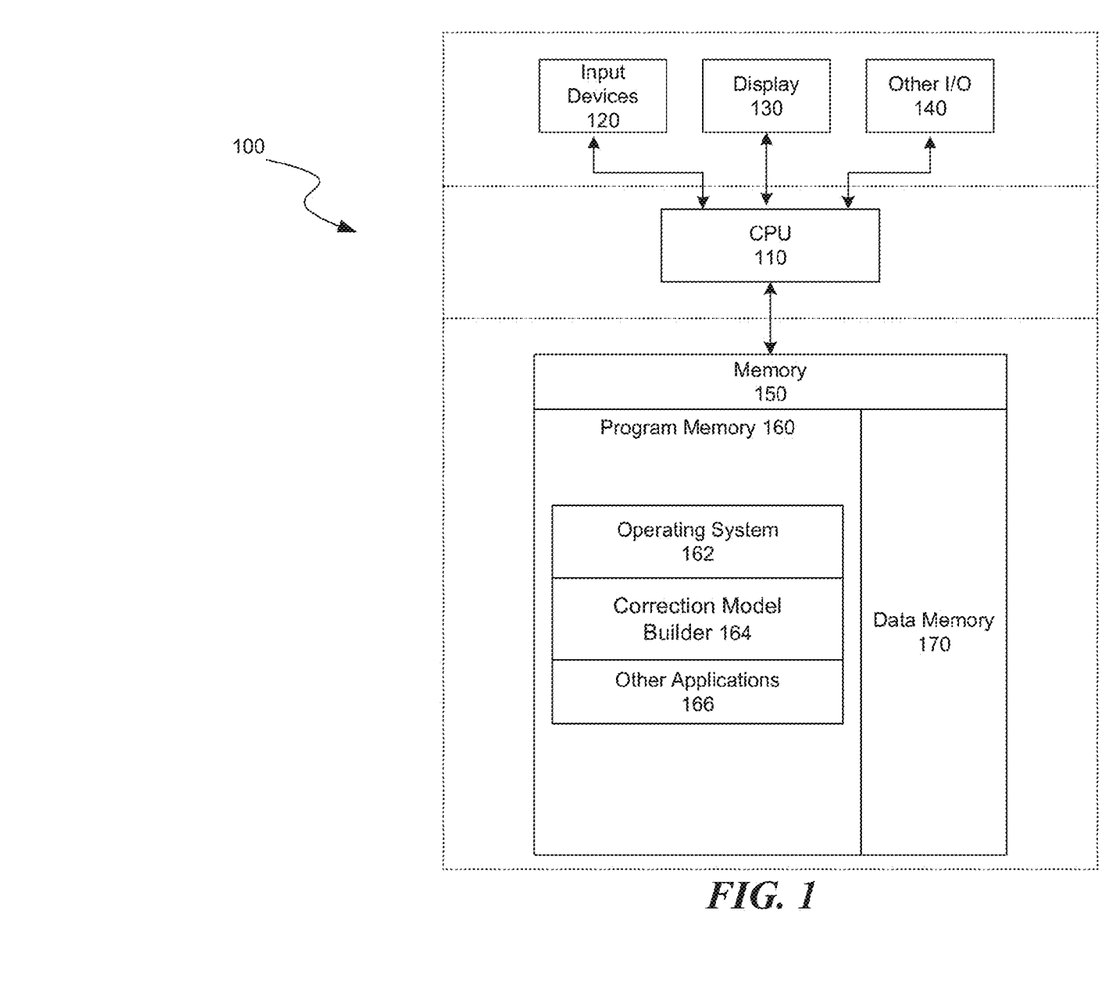
FIG. 1 is a block diagram illustrating an overview of devices on which some implementations of the disclosed technology can operate.

Several implementations of the described technology are discussed below in more detail in reference to the figures. Turning now to the figures, FIG. 1 is a block diagram illustrating an overview of devices 100 on which some implementations of the disclosed technology may operate. The devices can comprise hardware components of a device 100 that builds corrections models for machine-translation based corrections. Device 100 can include one or more input devices 120 that provide input to the CPU (processor) 110, notifying it of actions. The actions are typically mediated by a hardware controller that interprets the signals received from the input device and communicates the information to the CPU 110 using a communication protocol. Input devices 120 include, for example, a mouse, a keyboard, a touchscreen, an infrared sensor, a touchpad, a wearable input device, a camera- or image-based input device, a microphone, or other user input devices.

CPU 110 can be a single processing unit or multiple processing units in a device or distributed across multiple devices. CPU 110 can be coupled to other hardware devices, for example, with the use of a bus, such as a PCI bus or SCSI bus. The CPU 110 can communicate with a hardware controller for devices, such as for a display 130. Display 130 can be used to display text and graphics. In some examples, display 130 provides graphical and textual visual feedback to a user. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected display (such as a heads-up display device or a head-mounted device), and so on. Other I/O devices 140 can also be coupled to the processor, such as a network card, video card, audio card, USB, firewire or other external device, camera, printer, speakers, CD-ROM drive, DVD drive, disk drive, or Blu-Ray device.

In some implementations, the device 100 also includes a communication device capable of communicating wirelessly or wire-based with a network node. The communication device can communicate with another device or a server through a network using, for example, TCP/IP protocols. Device 100 can utilize the communication device to distribute operations across multiple network devices.

The CPU 110 has access to a memory 150. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, floppy disks, CDs, DVDs, magnetic storage devices, tape drives, device buffers, and so forth. A memory is not a propagating signal divorced from underlying hardware; a memory is thus non-transitory. Memory 150 includes program memory 160 that stores programs and software, such as an operating system 162, correction model builder 164, and any other application programs 166. Memory 150 also includes data memory 170 that can include, for example, language snippets, viable corrections, alignment metadata, identified rules, edit distance algorithms, dictionaries, threshold values, configuration data, settings, and user options or preferences which can be provided to the program memory 160 or any element of the device 100.

The disclosed technology is operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, tablet devices, multiprocessor systems, microprocessor-based systems, set-top boxes, programmable consumer electronics, network PCs, minicomputers, mainframe computers, distributed computing environments that include any of the above systems or devices, and the like.

Figure 2:
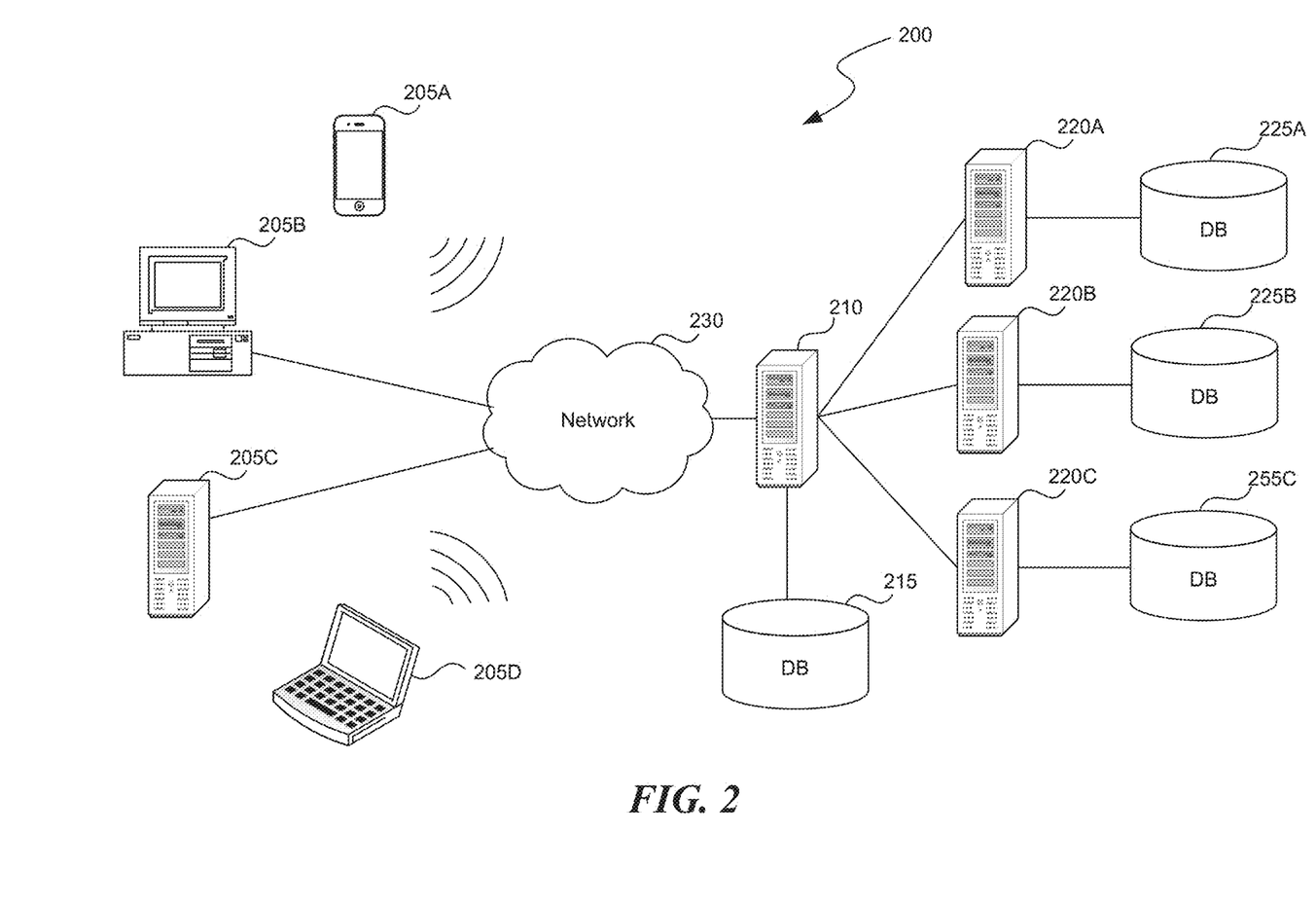
FIG. 2 is a block diagram illustrating an overview of an environment in which some implementations of the disclosed technology can operate.

FIG. 2 is a block diagram illustrating an overview of an environment 200 in which some implementations of the disclosed technology may operate. Environment 200 can include one or more client computing devices 205A-D, examples of which may include device 100. Client computing devices 205 can operate in a networked environment using logical connections 210 through network 230 to one or more remote computers such as a server computing device.

In some implementations, server 210 can be an edge server which receives client requests and coordinates fulfillment of those requests through other servers, such as servers 220A-C. Server computing devices 210 and 220 can comprise computing systems, such as device 100. Though each server computing device 210 and 220 is displayed logically as a single server, server computing devices can each be a distributed computing environment encompassing multiple computing devices located at the same or at geographically disparate physical locations. In some implementations, each server 220 corresponds to a group of servers.

Client computing devices 205 and server computing devices 210 and 220 can each act as a server or client to other server/client devices. Server 210 can connect to a database 215. Servers 220A-C can each connect to a corresponding database 225A-C. As discussed above, each server 220 may correspond to a group of servers, and each of these servers can share a database or can have their own database.

Databases 215 and 225 can warehouse (e.g. store) information such as language snippets, identified rules, dictionaries, and threshold values. Though databases 215 and 225 are displayed logically as single units, databases 215 and 225 can each be a distributed computing environment encompassing multiple computing devices, can be located within their corresponding server, or can be located at the same or at geographically disparate physical locations.

Network 230 can be a local area network (LAN) or a wide area network (WAN), but can also be other wired or wireless networks. Network 230 may be the Internet or some other public or private network. The client computing devices 205 can be connected to network 230 through a network interface, such as by wired or wireless communication. While the connections between server 210 and servers 220 are shown as separate connections, these connections can be any kind of local, wide area, wired, or wireless network, including network 230 or a separate public or private network.

Figure 3:
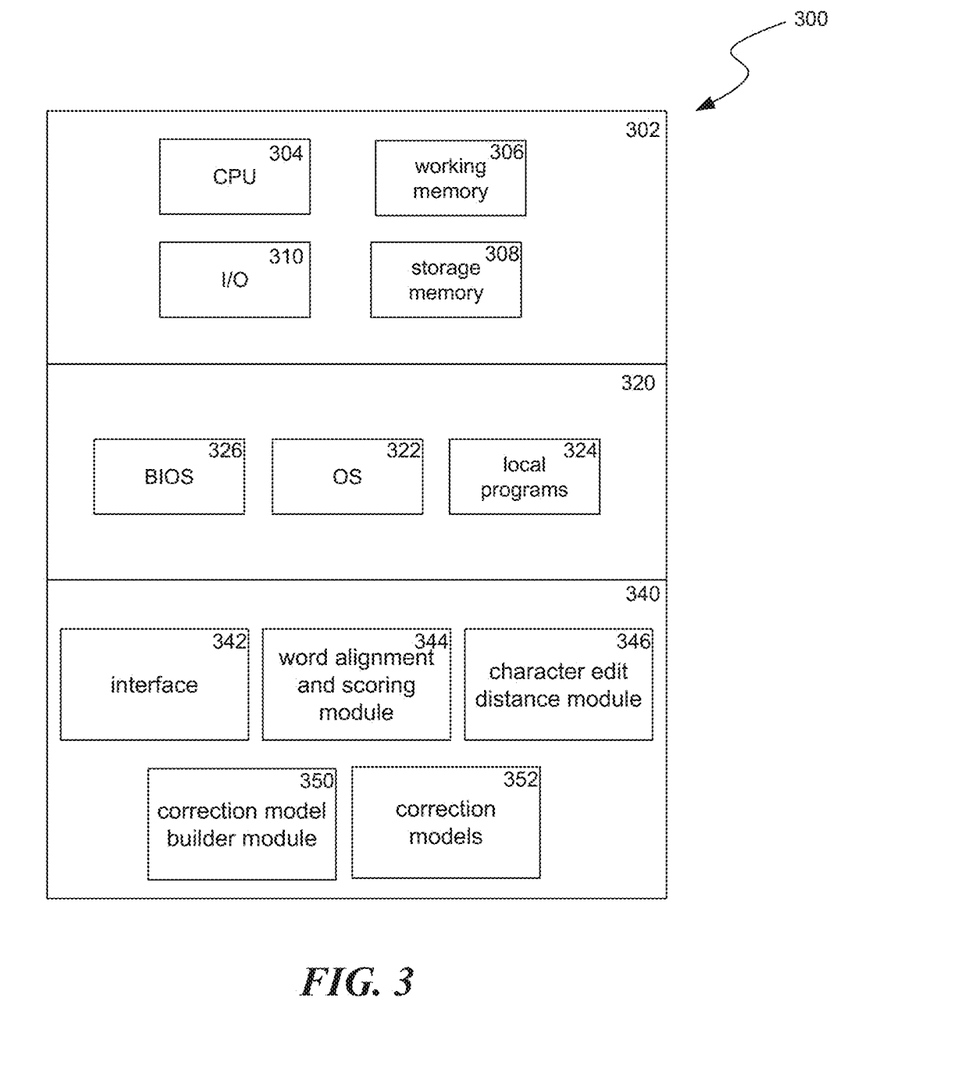
FIG. 3 is a block diagram illustrating components which, in some implementations, can be used in a system employing the disclosed technology.

FIG. 3 is a block diagram illustrating components 300 which, in some implementations, can be used in a system implementing the disclosed technology. The components 300 include hardware 302, general software 320, and specialized components 340. As discussed above, a system implementing the disclosed technology can use various hardware including central processing units 304, working memory 306, storage memory 308, and input and output devices 310. Components 300 can be implemented in a client computing device such as client computing devices 205 or on a server computing device, such as server computing device 210 or 220.

General software 320 can include various applications including an operating system 322, local programs 324, and a BIOS 326. Specialized components 340 can be subcomponents of a general software application 320, such as a local programs 324. Specialized components 340 can include word alignment and scoring module 344, character edit distance module 346, correction model builder module 350, correction models 352, and components that can be used for controlling and receiving data from the specialized components, such as interface 342.

Word alignment and scoring module 344 can receive a pair of snippets, such as through interface 342, and determine which words between the snippets to align. In various implementations an alignment can be found using a word-centric approach or a character-centric approach.

In the word-centric approach to word alignment, an alignment can be found by determining an alignment that yields the lowest total edit distance between the snippets. As used herein, a "total edit distance" for an alignment is the sum of the character edit distances between the aligned word pairs and the sum of the characters of unaligned words of the two snippets in the snippet pair. For example, a snippet pair comprising the snippets "gong tome" and "I'm going home," can have a word alignment of: (<no word>, I'm), (gong, going), (tome, home). The character edit differences for each of these pairs, as computed by the character edit distance module 346 discussed below, is (<no word>, I'm)=3, (gong, going)=1, (tome, home)=1. The sum of these character edit difference values, 5, is the total edit distance for this snippet pair using this alignment. In some implementations, to find the alignment with the lowest total edit distance between snippet S comprising words s1 . . . sN and snippet T comprising words t1 . . . tM a recursive algorithm can be used. For example, edit_distance(s1 . . . sN, t1 . . . tM)=minimum(substitution_cost(s1, t1)+edit_distance (s2 . . . sN, t2 . . . tM), deletion_cost(s1)+edit_distance (s2 . . . sN, t1 . . . tM), insertion_cost(t1)+edit_ distance(s1 . . . sN, t2 . . . tM)). This formula recurses until a termination condition: edit_distance(sequence, empty_sequence)=deletion_cost(sequence) or edit_distance(empty_ sequence, sequence)=insertion_cost(sequence) is reached. In various other implementations, the word alignment module 344 can be configured to find alignments by: finding all possible alignments; first finding exact matching words or words that are within a threshold difference of each other and limit possible alignments to those that include the matching or sufficiently similar word matches; or limiting word matches to being within a threshold edit distance of each other. Identifying word alignments using the word-centric approach is described in greater detail below in relation to FIG. 6A. In various implementations, correction rules are employed as part of a translation system from incorrectly spelled to correctly spelled.

Figure 6A:
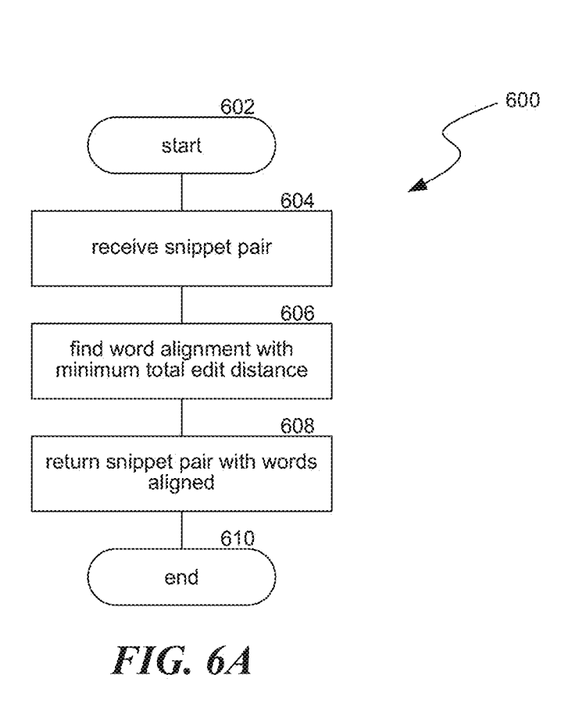
FIGS. 6A and 6B are flow diagrams illustrating processes used in various implementations for determining a word alignment between a pair of snippets.
Figure 6B:
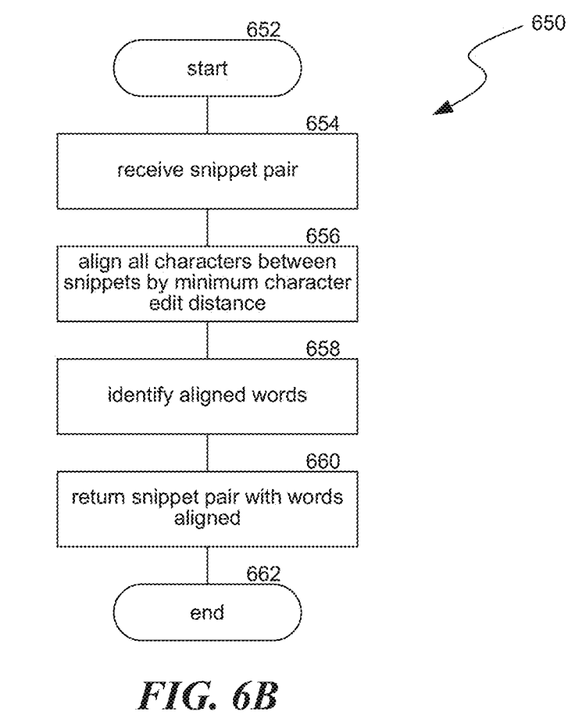

In the character-centric approach to word alignment, an alignment can be found by first aligning all characters, including white spaces, between the two snippets of the snippet pair according to a minimum character edit distance, as computed by the character edit distance module 346. Any first word in a first of the snippets that has at least one letter in common with a second word in a second of the snippets is considered aligned with that second word. In the character-centric approach, a word from one of the snippets can be aligned with more than one word in the second of the snippets, or vice-versa. For example, a snippet pair comprising the snippets "I loveu" and "I love you," according to its minimum character edit distance of three, has a character alignment of:

("I", "I")
(" ", " ")
("l", "l")
("o", "o")
("v", "v")
("e", "e")
(<no char>, " ")
(<no char>, "y")
(<no char>, "o")
("u", "u").

This alignment and character edit distance value can be computed by character edit distance module 346. The resulting word alignments, i.e. the words that have at least one overlapping character, are (I, I), (loveu, love), and (loveu, you). Identifying word alignments using the character-centric approach is described in greater detail below in relation to FIG. 6B.

Word alignment and scoring module 344 can also compute a word alignment score for aligned snippet pairs. In some implementations, the word alignment score for a selected snippet pair can be a count of unaligned words. In some implementations, the word alignment score can be weighted based on a length of one or more of the snippets, such as by computing a ratio of unaligned words to the average length of the snippets in the pair. Word alignment and scoring module 344 can then identify a snippet pair as a viable correction where the word alignment score is below a first threshold value or the character edit distance for all aligned words between the snippets in the snippet pair is below a second threshold value. For example, a word alignment threshold can be set to three (meaning no snippet pair will be identified as a viable correction if it has more than three unaligned words) and a character edit distance threshold can also be set to three (meaning no snippet pair will be identified as a viable correction if any aligned word pair between the snippets has a character edit distance of greater than 3). Identifying viable corrections is discussed in more detail below in relation to FIG. 5.

Character edit distance module 346 can receive two sequences of characters and compute a character edit distance between the sequences. In some implementations, character edit distance module 346 is configured to find a character edit distance by first finding a character alignment (for example using Levenshtein or Damerau-Levenshtein distance). In some implementations, character edit distance module 346 is configured to find a character alignment that yields a minimum character edit distance. In some implementations, computing edit distances using Damerau-Levenshtein can assign to a transposition cost values other than the cost value of an insertion, deletion, or substitution change. In some implementations, the insertion, deletion, or substitution cost value can be 1. For example, if a word pair includes the words "ahppi" and "happy," where the value of an insertion, deletion, or substitution change, such as the change of "i" to "y," is one, the transposition of "ah" and "ha" can, in various implementations, be assigned a value less than one, such as 0.5, equal to one, or greater than one, such as 1.5. Thus, the minimum character edit distances for "ahppi" and "happy" in the various versions of this example can be 1.5, 2, or 2.5.

Correction model builder module 350 can receive snippet pairs that have been identified as viable corrections from word alignment and scoring module 344 and use them to build or augment a correction model. Correction model builder module 350 can be configured to do this by first determining a word alignment between the snippets of each received snippet pair. In some implementations, this alignment can be determined as part of the process for identifying the snippet pair as a viable correction. In some implementations, the alignment can be found using the IBM or HMM alignment models, with additional constraints limiting the length and/or number of jumps a word can be moved to achieve an alignment. In some implementations, the constraints can limit word jumps to jumping a word forward only. In some implementations, the constraints can limit word jumps to a maximum of one jump backward or up to two jumps forward. In some implementations, word alignments found by correction model builder module 350 can include not only single word pairings, but can also include groups of words aligned to a group of one or more other words. In some implementations, these groups can be limited to a maximum number of words, such as 2, 3, 4, or 5.

Once a word alignment is determined, correction model builder module 350 can extract rules from the aligned viable corrections. A "rule," as used herein, is a pair of words or word sequences with an assigned score. In some implementations, a rule can have a list of assigned scores. For example, a rule can comprise hlelo world→hello world with scores 0.1, 0.53, 2. "Words," as used herein, can be traditional words, i.e. characters separated by whitespace or punctuation, or can be other character groupings, such as a number of sequential characters. The word pair of a rule can be directional, indicating that if a first word of the rule pair is found it can be replaced with the second word of the word pair. As used herein, a rule can be denoted as "firstWordGroup"→"secondWordGroup":score, where firstWordGroup indicates one or more words to be replaced, secondWordGroup indicates one or more words to replace the words in firstWordGroup, and score represents a corresponding rule score. In some implementations, the rule score can indicate when the replacement should be made or can be used to determine which rule should be used. For example, a correction model can include the rules "tu"→"to":.3 and "me tu"→"me too":.7. The "me tu"→"me too" rule may have a higher score because it includes more words. Applying the correction model in this example to correct the snippet "Me tu, that sounds great," the rule "me tu"→"me too" can be applied because it has a higher score than the "tu"→"to" rule. In some implementations, the scores of one or more rules can be used to create a combined confidence score for a resulting correction that is constructed with the one or more rules. A correction that is constructed with less rules can have a higher score because there can be a penalty for the number of rules employed.

Correction model builder module 350 can extract rule word group pairs from aligned viable corrections by selecting aligned words or word groups that have at least one character difference.

The score(s) for each rule can be computed based on any combination of: the number of words in the group pair, a historical frequency for which this pair has been found, or difference type(s) (deletions, insertions, substitutions, or transpositions). For example, with a rule pair "were to going visit moom"→"we're going to visit mom," the score could be computed by attributing a difference score based on a sum for each of the types of changes: 1 for each insertion, substitution, or deletion, 1.5 for each transposition of length one, and 2 for each transposition of length greater than one (3.5 in this example, resulting from one insertion, one deletion, and a transposition of length one) and dividing that by a length score determined by computing the average number of words between the pair (5 in this example). Thus, using the combination method from this example, the rule score would be 0.7. In some implementations, the score for each rule in the correction model can be weighted based on the frequency the pair for that rule is found. In some implementations, rules are only included in a correction module when the same rule is found a threshold number of times.

Correction models built by correction model builder module 350 be can be stored as correction models 352. Correction models 352 can be used in the same computing system as components 344-350, or can be transferred to other computing systems for independent use. Correction models can be used to generate a corrected language snippet for a selected language snippet. This can be accomplished by determining if any "n-gram" (i.e. a sequence of contiguous words) of the selected language snippet matches a first snippet of a rule included in a correction model and replacing the n-gram with the second snippet of that matching rule. In some implementations, where more than one rule is matched to an n-gram, the rule with the higher score can be used. In some implementations, where more than one rule is matched to an n-gram, multiple possible corrections can be created using each matching rule, and a combination of the scores from the used rules can be employed to select a preferred possible correction. In some implementations, correction models 352 can be used as an intermediate step to a translation, as a method of expanding the search parameters of a query, or as part of an autocorrect or correction suggestion system for user input.

In some implementations, additional conditions can be compared to determine if a rule from a correction model should be applied. For example, a rule can be associated with a context such as other content items or links, a location or location type, one or more identified author characteristics (e.g. location, age, gender, ethnicity, profession, income, friend group, etc.), or a geographic location. Rules with these types of contexts can be configured to be employed where the selected language snippet is associated with a sufficiently similar context.

In some implementations, determining if a rule matches an n-gram for a selected snippet can include finding non-exact matches. For example, if a rule pair is "spexial"→"special," the corrected character can be replaced with a wild card character so any n-gram matching "spe_ial" will be replaced with "special." Alternatively, certain likely letters can be used to make a correction, such as the keys on a standard keyboard surrounding the corrected letter or a similar type of letter such as a vowel. For example, the correction "spexial"→"special" can be abstracted as "spe[x, z, a, s, d]ial"→"special." As another example, the correction "cag"→"cog" can be abstracted as "c[a, e, i, u]g"→"cog." In some implementations, the degree of matching for a replacement to occur can be application specific. For example, an exact match can be needed when doing an automatic correction, whereas less than exact matches can result in a replacement when creating an intermediate language snippet for a machine translation or for augmenting query search results.

Those skilled in the art will appreciate that the components illustrated in FIGS. 1-3 described above, and in each of the flow diagrams discussed below, may be altered in a variety of ways. For example, the order of the logic may be rearranged, substeps may be performed in parallel, illustrated logic may be omitted, other logic may be included, etc.

Figure 4:
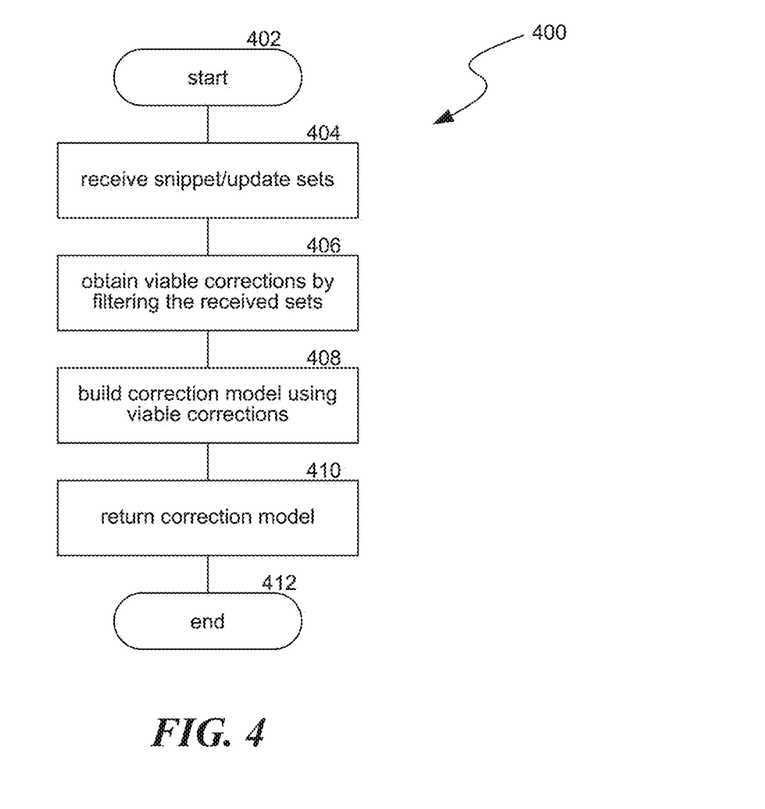
FIG. 4 is a flow diagram illustrating a process used in some implementations for building a correction model.

FIG. 4 is a flow diagram illustrating a process 400 used in some implementations for building a correction model. Process 400 begins at block 402 and continues to block 404. At block 404, process 400 receives sets of language snippets, each set comprising at least an initial language snippet and one or more subsequent language snippets. As used herein, an initial language snippet may be the first created language snippet of a related series of snippets or may be a language snippet from a related series that is not the first of the series, but is the first that is included in the received set. In some implementations, the language snippets included in one or more of the received language snippet sets can be ordered according to which language snippet is an update, correction, or modification of the previous language snippet. In various implementations, the language snippet sets can be obtained from a post to a social media website and subsequent updates to that post, a sequence of similar queries made by the same user within a timeframe, or sequential versions of websites, such as recorded editions of a wiki-type website. In some implementations, snippet sets can be obtained from a portion of one of these sources such as by splitting posts and corresponding updates into snippets of a maximum length or by creating snippets by selecting only the words within a threshold distance of a changed word. Each of the language snippet sets can include at least two language snippets. In some implementations, one or more of the sets can include more than two language snippets, such as where a social media user makes multiple updates to the same post.

At block 406, the received language snippet sets can be filtered to identify language snippets that are viable corrections. Identifying language snippets as viable corrections includes creating snippet pairs, aligning words or word groups within the snippet pairs, and identifying snippet pairs as viable corrections where the snippet pair does not have more than a threshold number of unaligned words and does not have any aligned word with a minimum character edit distance that is above a threshold. Identifying viable corrections is described in more detail below in relation to FIGS. 5, 6A, and 6B.

At block 408, a correction model can be built or updated using the viable corrections identified at block 406. Building a correction model can include determining an alignment between word groups of viable corrections, extracting rules comprising all aligned word groups and a corresponding score. In various implementations, the rules can be limited to aligned word groups or word groups that have at least one difference. Process 400 can incorporate the extracted rules into a correction model. Building a correction model is described in more detail below in relation to FIG. 7.

Figure 5:
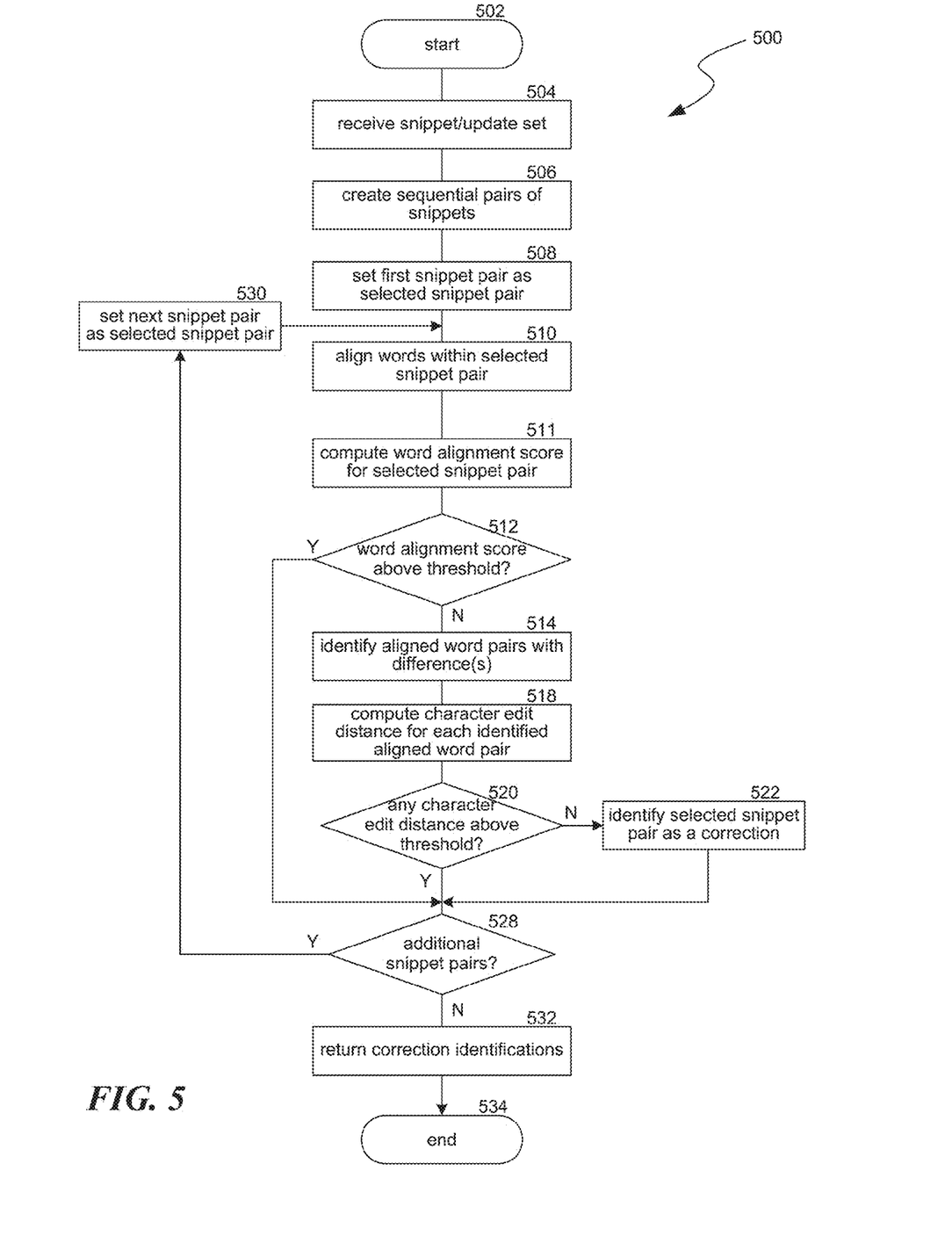
FIG. 5 is a flow diagram illustrating a process, used in some implementations, that finds viable corrections by filtering for corrections from snippet pairs.

FIG. 5 is a flow diagram illustrating a process 500, used in some implementations, that finds viable corrections by filtering for viable corrections from snippet pairs. Process 500 begins at block 502 and continues to block 504. At block 504, process 500 receives a set of snippets comprising at least an initial language snippet and one or more subsequent language snippets.

At block 506, process 500 can create pairs of snippets. The created pairs can be all potential pairs between the snippets in the received set. For example, for snippets A, B, and C, with order A→B→C, the pairs could be AB, BC, and AC. In some implementations, the pairs can retain indications of an order between the pairs. In some implementations, the created pairs can include only those where the later language snippet is a direct update of the earlier snippet. For example, for snippets A, B, and C, with order A→B→C, the pairs could be AB and BC. In some implementations, the created pairs can include only the first and last snippet. For example, for snippets A, B, and C, with order A→B→C, the pair could be AC.

At block 508, the first pair created at block 506 is set as a selected pair. At block 510 the words between the selected pair of language snippets can be aligned. In various implementations, aligning words can be performed using the word-centric approach or the character-centric approach. Aligning words between a pair of snippets using the word-centric approach is described in more detail below in relation to FIG. 6A. Aligning words between a pair of snippets using the character-centric approach is described in more detail below in relation to FIG. 6B.

At block 511, process 500 can compute a word alignment score for the selected snippet pair. In various implementations, a word alignment score can be computed as a total count of unaligned words or as a count of unaligned words compared to a length of one or both of the snippets in the selected language snippet pair. For example, for a selected snippet pair that has an average of eight words in each snippet and three unaligned words, the word alignment score can be the percentage of unaligned words: 37.5%.

At decision block 512, process 500 determines whether the word alignment score is above a word alignment score threshold. For example, the word alignment score threshold can be two, three, or five total unaligned words or the equivalent of no more than 5%, 10%, 20%, 25%, or 33% unaligned words. If the word alignment score is above the word alignment score threshold, process 500 continues to block 528, otherwise process 500 continues to block 514.

At block 514, the selected language snippet pair is deconstructed into word pairs according to the alignment found at block 510. Where the alignment indicates a word insertion or deletion, the word pairs can include a word from one language snippet for half of the pair and an indication of a blank for the other half of the word pair. In some implementations, the word pairs selected at block 514 comprise only the word pairs where there is not an exact match between the pair. In some implementations, the word pairs selected at block 514 can comprise only the word pairs that correspond to a word change, but not where a word in one snippet matches to a blank in the other snippet. In some implementations, the word pairs can maintain an order established between their corresponding language snippets. For example, for the snippets A→B where snippet A includes words a1-aN and snippet B includes words b1-bN, a word pair can be words a3→b5. In some implementations, word pairs can include a match between multiple words. For example, for the snippet pairs: "this is my goden retriever" and "this is my golden retriever," the word pair can be "goden retriever"→"golden retriever."

At block 518, a minimum character edit distance is computed for each word pair determined at block 514. As discussed above, this minimum character edit distance is computed such that a minimum number of character changes are used to convert (A) words in the word pair from a first of the snippets to (B) the words in the word pair from a second of the snippets. The minimum character edit distances can be computed using Levenshtein, Damerau-Levenshtein, or modified Damerau-Levenshtein edit distances. In various implementations, modified Damerau-Levenshtein edit distances can assign to some changes different values than other changes. For example, transposition changes can be assigned a value higher or lower than the value assigned to insertion, deletion, or substitution changes. In some implementations, any or all of insertions, deletions, substitutions or transpositions can be assigned different values. For example, the value assigned to insertion and deletion changes can be 1, the value assigned to substitution changes can be 2, while the value assigned to character transpositions can be 0.5. In various implementations, punctuation typically included as part of a word, such as an apostrophe in a contraction or an accent mark, can be included or ignored in the minimum character edit distance analysis. In some implementations, data computed when determining the word alignment at block 510, such as a minimum edit distance found for words at block 606 or the character alignment found at block 656, can be re-used to compute the character edit distance at block 518.

At decision block 520, process 500 determines whether any of the minimum character edit distances found at block 518 are above a character edit distance threshold. For example, this character edit distance threshold can be two or three. The comparison at block 520 can take into account the length of one of the words in the selected word pair or the average length of the words in the selected word pair. For example, where the character edit distance is no more than 20 percent of the entire word, meaning that no more than 20 percent of the characters of one word of a pair were changed to arrive at the other word of the selected word pair, the character edit distance can be considered below the character edit distance threshold. If the character edit distance is above the character edit distance threshold, process 500 continues to block 528, otherwise process 500 continues to block 522. At block 522 the selected snippet pair can be identified as a viable correction. This can include, for example, creating a list of viable corrections, storing a pointer to the selected snippet pair, or adding the selected snippet pair to a master list of viable corrections or, where the master list already contains the selected viable correction, updating a corresponding frequency value for that viable correction.

At decision block 528, process 500 determines whether there are additional language snippet pairs that were identified at block 506 and that have not been analyzed by the loop between blocks 510-530. If there are additional language snippet pairs, process 500 continues to block 530 where the next one of these language snippet pairs can be set as the selected snippet pair to be operated on by the loop between blocks 510-530. If there are no additional language snippet pairs, process 500 continues to block 532. At block 532, the viable corrections identified at block 522 can be returned. In various implementations, this can include providing a data structure containing the viable corrections or a locator for a data structure. In some implementations, block 522 can store data accessible outside process 500 (e.g. storing in a variable accessible outside a current function or writing to separate database) in which case process 500 may not need to return viable corrections. Process 500 then continues to block 534, where it ends.

FIG. 6A is a flow diagram illustrating a process 600 used in some implementations for determining a word alignment between a pair of snippets. Process 600 begins at block 602 and continues to block 604. At block 604, process 600 can receive a pair of snippets.

At block 606, process 600 can find a word alignment between the snippets in the received pair of snippets, where the alignment corresponds to a minimum total edit distance. Process 600 can compute the total edit distance for a selected alignment by adding together the minimum edit distance for each word pair, or word group pair, of the selected alignment. The alignment with the lowest total edit distance is selected as the snippet alignment.

In some implementations, to find the alignment with the lowest total edit distance between snippet S comprising words s1 . . . sN and snippet T comprising words t1 . . . tM a recursive algorithm can be used. For example, edit_distance(s1 . . . sN, t1 . . . tM)=minimum(substitution_cost(s1, t1)+edit_distance(s2 . . . sN, t2 . . . tM), deletion_cost(s1)+edit_distance(s2 . . . sN, t1 . . . tM), insertion_cost(t1)+edit_distance(s1 . . . sN, t2 . . . tM)). This formula recurses until a termination condition: edit_distance(sequence, empty_sequence)=deletion_cost(sequence) or edit_distance(empty_sequence, sequence)=insertion_cost(sequence) is reached. In various implementations, process 600 can find potential alignments by: computing all possible alignments between the received snippet pair, computing all alignments that do not require reordering words, computing all alignments that do not require transpositions greater than a threshold distance, or finding alignments that have at least a threshold ratio of words that have exact matches between the snippets of the snippet pair. In various implementations, word pairs can match only single words between snippets or can match groups of words between snippets.

Process 600 can then compute the minimum character edit distance for each aligned word pair by finding a best character alignment (which can use Levenshtein or Damerau-Levenshtein distances in various implementations) and assigning a value to each difference in the alignment. In some implementations, the substitution cost between two words can be obtained by the character based edit distance between the two words, the deletion cost can be the number of characters of the word deleted, the insertion cost can be the number of characters of the word inserted, and the transposition cost can be the number of transpositions made or the number of transpositions made each multiplied by that transpositions' length. The sum of these character difference values for the word pair is the minimum character edit distance for that pair. As discussed above, in some implementations, computing edit distances using Damerau-Levenshtein can assign to a transposition a change value other than the value of an insertion, deletion, or substitution change. The alignment with the lowest total edit distance is selected as the snippet pair alignment. At block 608, the snippet pair is returned with the selected alignment. At block 610, process 600 ends.

FIG. 6B is a flow diagram illustrating a process 650 used in some implementations for determining a word alignment between a pair of snippets. Process 650 begins at block 652 and continues to block 654. At block 654, process 600 can receive a pair of snippets. At block 656, the characters, including white spaces, between the snippets in the received snippet pair are aligned according to a minimum character edit distance. In some implementations, this alignment can use the Levenshtein alignment method, where characters are aligned by determining the minimum number of character insertions, deletions, or substitutions that are required to transform the first snippet of the snippet pair into the second snippet of the snippet pair. In some implementations, this alignment can use the Damerau-Levenshtein alignment method, where characters are aligned by determining the minimum number of character insertions, deletions, substitutions, or transpositions required to transform the first snippet of the snippet pair into the second snippet of the snippet pair. In some implementations, the alignment method assigns the same value to insertions, deletions, substitutions, or, in the Damerau-Levenshtein method, transpositions when computing character edit differences. In some implementations, the alignment method assigns values to insertions, deletions, substitutions, or transpositions based on the type of change that is made. In some implementations, the alignment method assigns values to insertions, deletions, substitutions, or transpositions based on the similarity between the change, such as the distance of the transposition, a distance on a keyboard between the character in the first snippet and the aligned character in the second snippet, a similarity between types of the character (i.e. both numbers, both vowels, both consonants, both in a group of letters typically found to be mistakenly substituted) in the first snippet and the aligned character in the second snippet.

At block 658, aligned words can be identified based on the character alignment found at block 656. At block 658, two words are determined to be aligned if, in the character alignment, they have at least one character in common. It is possible, in some implementations, for multiple words in one snippet of the snippet pair to be aligned to a single word in the other snippet of the snippet pair. For example, for the snippet pair: "asplit!"→"a split!," the character alignment with the minimum character edit distance is:
("a", "a")
(<no char>, " ")
("s", "s")
("p", "p")
("l", "l")
("i", "i")
("t", "t")

Because "asplit" from the first snippet shares at least one character with both "a" and "split" in the second snippet, the word alignments are ("asplit!", "a") and ("asplit!", "split!"). In this example, the punctuation is included with the words. In some implementations, punctuation can be ignored. In some implementations, punctuation can be separated from words by a preprocessing operation. At block 660, the snippet pair is returned with the alignment determined at block 658. At block 662, process 650 ends.

Figure 7:
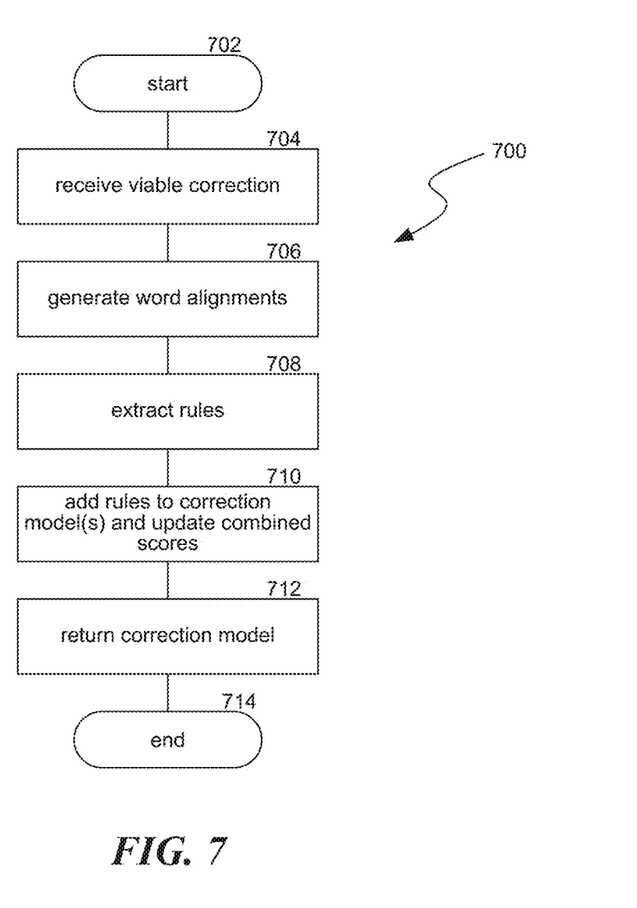
FIG. 7 is a flow diagram illustrating a process used in some implementations for building a correction model using located corrections.

FIG. 7 is a flow diagram illustrating a process 700 used in some implementations for building a correction model using viable corrections. Process 700 begins at block 702 and continues to block 704. At block 704, process 700 receives a viable correction, such as a viable correction identified by process 500.

At block 706, process 700 can generate a word alignment for the received viable correction. In some implementations, the word alignment can be the word alignment found by process 500 at block 510, using either process 600 or 650. In some implementations, the word alignment can be generated by applying a modified version of the IBM or HMM alignment models. In some implementations, one of these alignment models can be modified to only make forward jumps of a threshold amount, such as 2 or 3 words. In some implementations, one of these alignment models can be modified to do jumps that are no more than one word backward and no more than two words forward.

At block 708, process 700 can extract the aligned words of the viable correction as rules. As discussed above, a rule comprises a word or word group pair with a score. In some implementations, the extracted rules can be any of the word pairs that have a difference. In various implementations, the rules can include all aligned word groups or word groups that have at least one difference. In some implementations, some extracted rules can be any of the word pairs that have a difference and where the number of differences between the pair is below a threshold, such as two or three differences. Process 700 can then assign a score to each identified word pair. In some implementations, the score can be computed based on a similarity between the word pairs, a length (characters or number of words) in the word pair, a difference type, a magnitude of one or more differences such as a jump, or a number or frequency of differences in the word pair.

At block 710, the extracted rules can be added to a correction model. If the correction model already includes the word pair of a rule, instead of adding the rule to the model, the score for that rule can be updated. In some implementations, this updating can be an increase to the score, thereby increasing the score for rules that are found more frequently. In some implementations, the score for a rule A→B can be computed by dividing frequency(A→B) in a particular corpus by frequency(A) in that corpus. Thus, if rule A→B is more frequent than rule A→B', then A→B can have a better score. At block 712 the modified correction model can be returned. At block 714, process 700 ends.

Several implementations of the disclosed technology are described above in reference to the figures. The computing devices on which the described technology may be implemented may include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links may be used, such as the Internet, a local area network, a wide area network, or a point-to-point dial-up connection. Thus, computer-readable media can comprise computer-readable storage media (e.g., "non-transitory" media) and computer-readable transmission media.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle specified number of items, or that an item under comparison has a value within a middle specified percentage range.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C, etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above, are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for generating a natural language correction model comprising:
   obtaining one or more language snippet pairs comprising an initial language snippet and a subsequent language snippet;
   for at least one selected language snippet pair of the one or more language snippet pairs, identifying the selected language snippet pair as a viable correction pair by:
      aligning words between the initial language snippet and the subsequent language snippet of the selected language snippet pair to obtain an aligned version of the selected language snippet pair;
      computing a word alignment score for the aligned version of the selected language snippet pair;
      determining that the computed word alignment score for the aligned version of the selected language snippet pair is below a word alignment threshold value;
      computing a character edit distance for one or more of the aligned words within the aligned version of the selected language snippet pair; and
      determining that each computed character edit distance for the one or more of the aligned words within the selected language snippet pair is below a character distance threshold value;
   extracting rules from the viable correction pair; and
   incorporating the rules extracted from the viable correction pair into the natural language correction model, wherein the natural language correction model is used in a correction of a section of text by:
      identifying the section of text as matching the initial language snippet of the viable correction;
      using the subsequent language snippet of the viable correction to modify the section of text; and
      providing the modified version of the section of text.

2. The method of claim 1,
   wherein aligning words between the initial language snippet and the subsequent language snippet comprises determining an alignment comprising one or more word pairs, each of the one or more word pairs comprising a sequence of one or more word from the initial language snippet and a sequence of one or more word from the subsequent language snippet;
   wherein the alignment is chosen from multiple possible alignments by selecting the alignment with a lowest total edit distance; and
   wherein total edit distances for one or more of the multiple possible alignments are computed by summing all the character edit distances of word pairs and all the character edit distances of any unaligned words from a particular alignment.

3. The method of claim 1, wherein aligning words between the initial language snippet and the subsequent language snippet comprises:
   aligning characters, including whitespaces, between the initial language snippet and the subsequent language snippet according to a minimum character edit distance; and
   identifying a word from the initial language snippet as aligned with a word in the subsequent language snippet where, in the aligned characters, the word from the initial language snippet has at least one character aligned with at least one character from the word from the subsequent language snippet.

4. The method of claim 3,
   wherein aligning words between the initial language snippet and the subsequent language snippet comprises storing data resulting from aligning the characters; and
   wherein the character edit distance is based on the stored data resulting from aligning the characters.

5. The method of claim 1, wherein at least one edit distance is a Levenshtein distance.

6. The method of claim 1, wherein at least one edit distance is a Damerau-Levenshtein distance.

7. The method of claim 1,
   wherein the word alignment score is computed as a total number of unaligned words between the initial language snippet and the subsequent language snippet; and
   wherein determining that the computed word alignment score for the aligned version of the selected language snippet pair is below the word alignment threshold value is accomplished by determining that the word alignment score indicates there are no more than three unaligned words.

8. The method of claim 1,
   wherein a selected character edit distance is computed as a total number of changes needed to convert a first sequence of one or more aligned words of a pair of aligned word sequences into a second sequence of one or more aligned words of the pair of aligned word sequences; and
   wherein determining that each computed character edit distance for the one or more of the aligned words within the selected language snippet pair is below the character distance threshold value is accomplished by determining that the selected character edit distance indicates that the pair of aligned word sequences has no more than three changes.

9. The method of claim 1, wherein extracting rules from the viable correction pair comprises:
obtaining a word alignment for the snippet pair of the viable correction pair;
extracting a rule word sequence pair from the word alignment; and
assigning one or more scores to the rule word sequence pair.

10. The method of claim 9, wherein obtaining the word alignment for the snippet pair of the viable correction pair comprises using HMM alignment modified to restrict jumps to no more than one backward and no more than two forward.

11. The method of claim 9, wherein obtaining the word alignment for the snippet pair of the viable correction pair comprises using the aligned version of the selected language snippet pair.

12. The method of claim 1 further comprising, for at least one identified pair of the one or more language snippet pairs, computing that the identified pair is not a viable correction by computing:
that the word alignment score for the identified pair is above the word alignment threshold value; or
that the character edit distance for one or more aligned words within the aligned version of the identified pair is above the character distance threshold value.

13. The method of claim 1, wherein at least one pair of the one or more language snippet pairs comprises:
a post to a social media website, by an author, as the initial language snippet; and
an update, by the author, to the post to the social media website as the subsequent language snippet.

14. The method of claim 1, wherein the natural language correction model is configured to be used as part of a machine translation of a provided language snippet by:
creating an intermediate version of the provided language snippet by using the modified version of the section of text in the intermediate version instead of the section of section of text in the provided language snippet that matches the initial language snippet of the viable correction;
performing a machine translation on the intermediate version; and
providing results of the machine translation on the intermediate version.

15. A system for identifying viable corrections comprising:
an interface configured to obtain one or more language snippet pairs, each obtained language snippet pair comprising a first language snippet and a second language snippet;
a word alignment and scoring module configured to, for at least one selected language snippet pair of the one or more language snippet pairs, identify the selected language snippet pair as a viable correction pair by:
computing a word alignment score for an aligned version of the selected language snippet pair; and
determining that the computed word alignment score for the aligned version of the selected language snippet pair is below a word alignment threshold value; and
a character edit distance module configured to compute a character edit distance for one or more of the aligned words within the aligned version of the selected language snippet pair; and
wherein the word alignment and scoring module is further configured to identify the selected language snippet pair as a viable correction pair by determining that each computed character edit distance for the one or more of the aligned words within the selected language snippet pair is below a character distance threshold value;
wherein the viable correction pair is used to correct a section of text by:
identifying the section of text as matching the initial language snippet of the viable correction;
using the subsequent language snippet of the viable correction to modify the section of text; and
providing the modified version of the section of text.

16. The system of claim 15, wherein the word alignment and scoring module is further configured to obtain the aligned version of the selected language snippet pair by:
aligning characters, including whitespaces, between the first language snippet and the second language snippet according to a minimum character edit distance; and
identifying a word from the first language snippet as aligned with a word in the second language snippet where the word from the first language snippet has at least one character aligned with at least one character from the word of the second language snippet in the aligned characters.

17. The system of claim 15,
wherein the word alignment and scoring module computes the word alignment score as a total number of unaligned words between the first language snippet and the second language snippet;
wherein the word alignment and scoring module determines that the computed word alignment score for the aligned version of selected language snippet pair is below the word alignment threshold value by determining that the word alignment score indicates there are no more than three unaligned words;
wherein the character edit distance module computes a selected character edit distance as a total number of changes needed to convert a first of a pair of aligned words into a second of the pair of aligned words; and
wherein the word alignment and scoring module determines that each computed character edit distance for the one or more of the aligned words within the selected language snippet pair is below the character distance threshold value by determining that the selected character edit distance indicates that the pair of aligned words has no more than three changes.

18. A non-transitory computer-readable storage medium storing instructions that, when executed by a computing system, cause the computing system to perform operations for identifying viable corrections, the operations comprising:
obtaining one or more language snippet pairs comprising an initial language snippet and a subsequent language snippet;
for at least one selected language snippet pair of the one or more language snippet pairs, identifying the selected language snippet pair as a viable correction pair by:
aligning words between the initial language snippet and the subsequent language snippet of the selected language snippet pair to obtain an aligned version of the selected language snippet pair;

computing a word alignment score for the aligned version of the selected language snippet pair;

determining that the computed word alignment score for the aligned version of the selected language snippet pair is below a word alignment threshold value;

computing a character edit distance for one or more of the aligned words within the aligned version of the selected language snippet pair; and determining that each computed character edit distance for the one or more of the aligned words within the selected language snippet pair is below a character distance threshold value; and wherein the viable correction pair is used to correct a section of text by:

identifying the section of text as matching the initial language snippet of the viable correction;

using the subsequent language snippet of the viable correction to modify the section of text; and providing the modified version of the section of text.

19. The non-transitory computer-readable storage medium of claim 18, wherein the operations further comprise extracting rules from the viable correction pair by:

obtaining a word alignment for the snippet pair of the viable correction pair;

extracting a rule word sequence pair from the word alignment, the rule word sequence pair comprising: A) a first sequence of one or more words from the initial language snippet of the viable correction pair and B) a second sequence of one or more words from the subsequent language snippet of the of the viable correction pair; and assigning one or more scores to the rule word sequence pair.

20. The non-transitory computer-readable storage medium of claim 18, wherein the initial language snippet of the viable correction comprises a post to a social media website, by an author; and the subsequent language snippet of the viable correction comprises an update, by the author, to the post to the social media website.

* * * * *